EMERGENCY ATMOSPHERE ANNEALING FURNACE AND METHOD

Original Filed Aug. 25, 1965

3 Sheets-Sheet 1

INVENTORS.
F. TROY COPE &
RALPH J. PERRINE
BY
Tilberry & Body
ATTORNEYS

EMERGENCY ATMOSPHERE ANNEALING FURNACE AND METHOD

Original Filed Aug. 25, 1965 3 Sheets-Sheet 2

INVENTORS.
F. TROY COPE &
RALPH J. PERRINE
BY
Tilberry & Body
ATTORNEYS

EMERGENCY ATMOSPHERE ANNEALING FURNACE AND METHOD

Original Filed Aug. 25, 1965 3 Sheets-Sheet 3

INVENTORS.
F. TROY COPE &
RALPH J. PERRINE

Tilberry & Body
ATTORNEYS

United States Patent Office

Re. 28,168
Reissued Sept. 24, 1974

28,168
EMERGENCY ATMOSPHERE ANNEALING FURNACE AND METHOD

F. Troy Cope, Salem, and Ralph J. Perrine, Columbiana, Ohio, by The Electric Furnace Co., Salem, Ohio, assignee Original No. 3,396,951, dated Aug. 13, 1968, Ser. No. 482,381, Aug. 25, 1965. Application for reissue Aug. 1, 1973, Ser. No. 384,460
Int. Cl. F27b *9/28*
U.S. Cl. 432—8 10 Claims

Matter enclosed in heavy brackets [ ] appears in the original patent but forms no part of this reissue specification; matter printed in italics indicates the additions made by reissue.

ABSTRACT OF THE DISCLOSURE

Method and apparatus for protecting a strip of metal moving continuously through a heating zone, against excessive oxidative degradation during longer than normal residence in the heating zone, including a control system responsive to a reduction in strip speed which purges the oxidizing ingredients in the heating zone atmosphere with a protective gas.

This invention pertains to the art of continuous strip annealing and, more specifically, to a gas purging system for protecting the metal strip from over-oxidation while motionless in the furnace in the event of an unavoidable shutdown.

The invention will be described with particular reference to a hot-dip galvanzing installation, however, it should be appreciated that it has much broader applications and may be used wherever the stoppage of continuous strip material would result in damage or destruction of a portion of the strip due to the exigencies of the particular treatment operation.

For example, in continuous galvanizing lines, steel strip is initially preheated to burn off roll lubricants and raise its temperature to about that of the coating bath. If preheating is done rapidly with a very brief exposure to combustion products, the amount of oxidation of the strip surfaces is only superficial and is easily reduced before the strip reaches the coating bath. In order to complete preheating in a short time, the preheating zone of the furnace must operate at a considerably higher temperature than the temperature of the coating bath. At the higher temperature a serious problem is encountered with unexpected strip stoppage. Even though the gas preheating burners are shut off, the refractory lining of the preheating zone contains enough stored heat to quickly raise the strip temperature to a higher temperature at which oxidation proceeds rapidly. This will cause severe oxidation of the portion stopped in the preheating zone, requiring it to be cut out of the continuous strip before operation can resume.

This difficulty and others are overcome with the present invention which provides a gas purging system responsive to an unavoidable slowdown or interruption of strip feeding to protect the strip from overoxidation in the furnace.

In accordance with the broadest aspects of the invention, the gas purging system includes a control responsive to strip movement to disconnect the normal source of atmosphere to a chamber through which the continuous strip is passing and simultaneously to connect a source of special atmosphere to the chamber, the special atmosphere being delivered at a rate and pressure sufficient to exclude the entry of outside air and prevent damage to the strip surfaces which would otherwise result by a prolonged exposure in the normal chamber atmosphere.

Further in accordance with the invention where the chamber is a gas-fired preheating zone of an annealing furnace, separate air and gas manifolds are provided for delivering the air and gas to the preheating burners and the gas purging system comprises normally open air and gas valve members simultaneously operable to close and shut off the burners upon strip stoppage, a bypass line connecting the main gas source to the gas manifold around the gas valve, and a normally closed valve located in the bypass line responsive to strip stoppage to open so that raw gas is introduced into the preheating zone through the existing burners to serve as the special atmosphere.

The principal object of the invention is to provide a protective atmosphere to prevent overoxidation of a metal strip when its rate of travel is unavoidably stopped or slowed in a hostile environment such as exists in the preheating zone of an annealing furnace.

Another object is to take advantage of existing fuel delivery lines and to utilize the main heating burners as nozzles for introducing the protective atmosphere.

These and other objects will become apparent by referring to the following description and drawings wherein.

Figure 1:
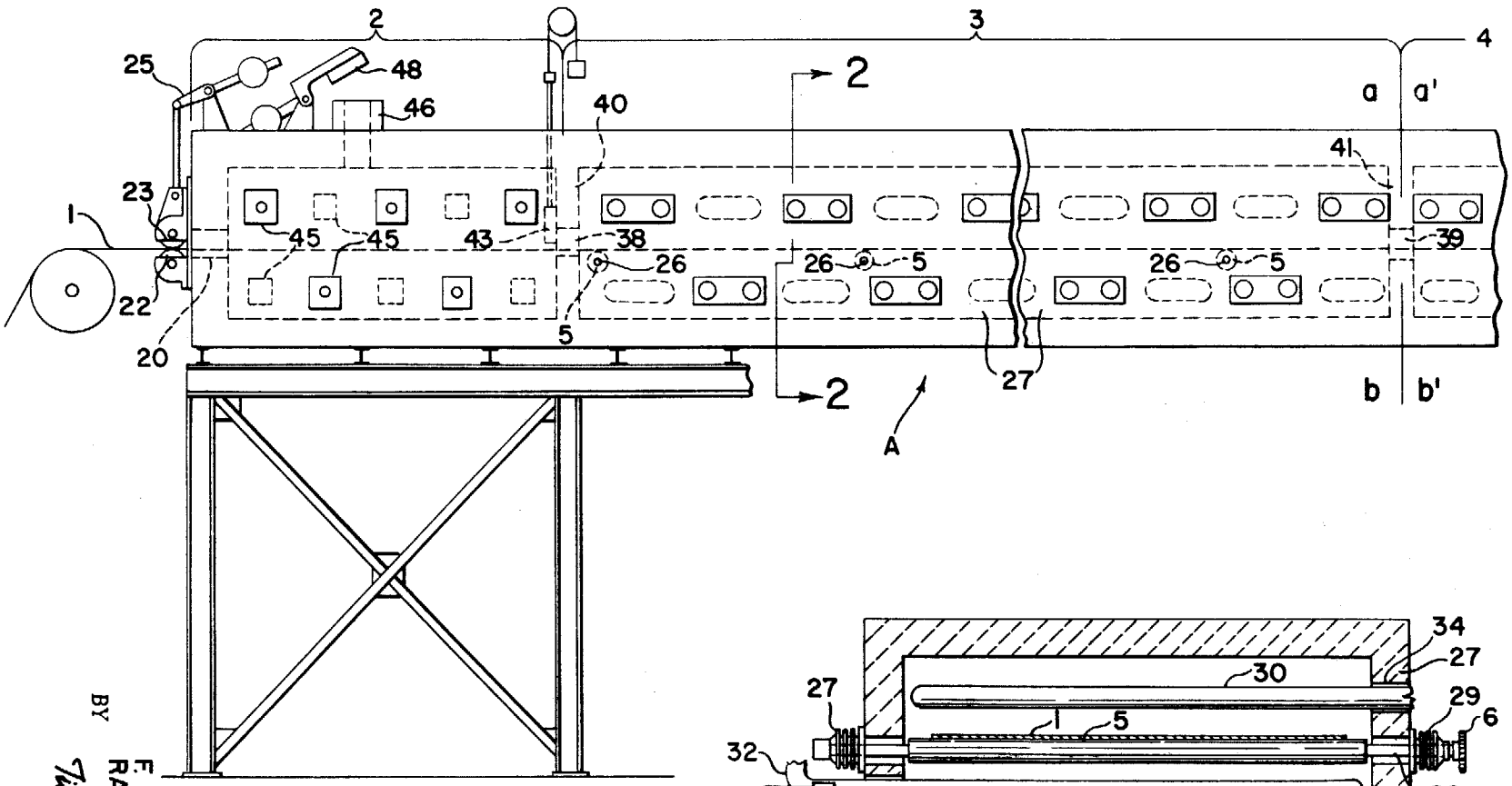
FIGURES 1 and 1A show a portion of a hot-dip galvanizing line, multizone horizontal strip annealing furnace incorporating the invention.
Figure 1A:
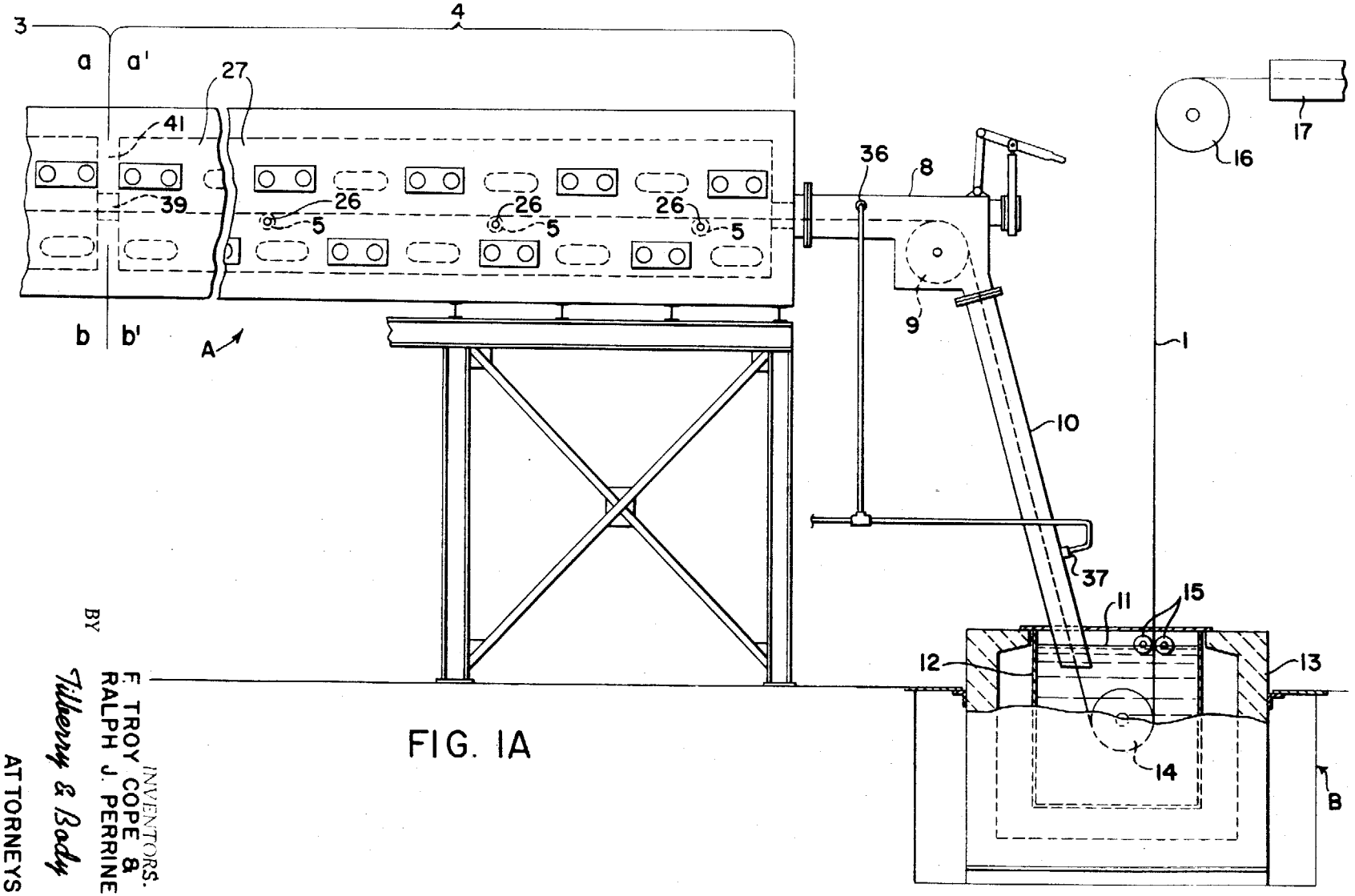

Referring now to the drawings wherein the figures are for the purpose of illustrating a preferred embodiment of the invention only and not for the purpose of limiting same, FIGURES 1 and 1A are exemplary of a continuous hot-dip strip galvanizing installation employing a horizontal annealing furnace A, such as might be used for continuous annealing in connection with the galvanizing of steel strip 1. The furnace A includes a direct fired preheat zone 2, a radiant tube heated reducing zone 3, and a cooling zone 4. Rolls 5 support the strip 1 at suitable intervals so that moderate strip tension is sufficient to avoid objectional sag between rolls. The rolls 5 are preferably driven by sprockets 6 at a surface speed equal to that at which the strip advances. As the strip 1 leaves the furnace at the exit end of cooling zone 4, it passes into an elbow housing 8 containing a turn roll 9. An inclined downchute 10 is attached to the housing 8 and extends below the surface 11 of molten zinc contained in a pot 12. Pot 12 is set in a furnace B which has suitable heating means (not shown) for maintaining the zinc bath temperature. A sinker roll 14 turns the strip 1 in the pot 12 for a vertical pass through coating rolls 15. Solidification of the zinc coating occurs before turn roll 16 is reached. After passing around turn roll 16 the strip enters a cooling tunnel 17 through which air is forced. Finally, the strip is recoiled or sheared into the required lengths as may be desired.

Figure 2:
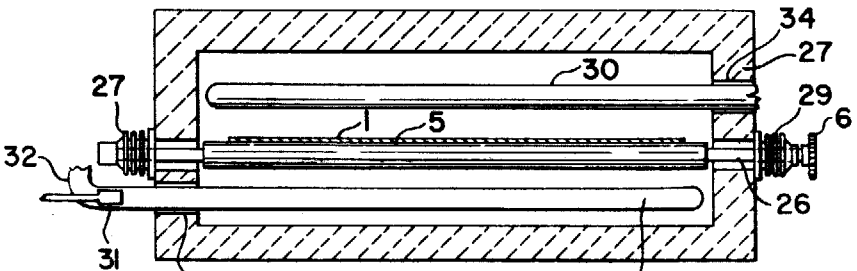
FIGURE 2 is an offset cross-sectional view taken along line 2—2 of the furnace shown in FIGURE 1; and, FIGURE 3 is a schematic diagram depicting the layout of the purging system superimposed on the firing system for the preheating zone of the furnace in FIGURE 1.

In accordance with the invention the furnace is constructed as airtight as possible to preserve the furnace atmosphere during normal operation and to exclude air during unavoidable shutdown periods, as will be explained hereinafter. The entrance 20 to preheating zone 2 is sealed by closure rolls 22, 23 which extend transversely completely across the entrance 20 and are in rolling engagement with strip 1 to prevent the inward flow of air. Upper roll 23 is movable vertically on the counterweighted arm 25 to clear threading tools when necessary. As seen in FIGURE 2, the support shafts 26 for each end of rolls 5 extend through the sidewalls 27 and are each supported on bearings 29 which are sealed in a suitable housing on the outside of wall 27 providing a closure around shaft 26 preventing the ingress of air at the various roll locations. Upper and lower U-shaped radiant heating tubes 30 are each fired and vented by gas burners 31 and vents 32 from an outside location and openings 34 therefore are sealed to prevent air leakage. Similarly, the end of the downchute 10 is immersed below the level of the zinc in the pot 12 to exclude air. Thus, the interior of the furnace A is virtually airtight, at least for the purposes of a controlled atmosphere furnace, and any leaks which do exist are not of sufficient magnitude to be of concern during normal operation due to the overpressure of the furnace atmosphere.

The atmosphere of the furnace A comprises essentially the products of combustion in the preheating zone 2 and a special atmosphere of a reducing gas, such as dissociated ammonia, in the reducing and cooling zones 3 and 4. The special atmosphere is admitted at suitable inlets 36 in elbow housings 8 and 37 in downchute 10. Sufficient volume is supplied to maintain a general flow toward the preheat zone 2 through openings 38, 39 in internal division walls 40, 41 which separate the three furnace zones 2, 3 and 4. During normal operation such flow sweeps out water vapor resulting from the reduction of any oxide film on the strip 1 as it leaves the preheating zone 2 and purges the furnace so as to hold contamination to an acceptable level. To insure the proper pressure differential, a sliding gate 43 is provided to restrict the opening 38 in division wall 40 so that the pressure in the reducing zone 3 is maintained greater than the pressure in the preheating zone 2. The gas-fired burners 45 in preheating zone 2 heat the strip to temperatures of about 700° to 900° F. This cleans the strip 1 by burning or vaporizing surface deposits, such as roll lubricants or the like, which might leave residues interfering with adhesion of the zinc coating. An exhaust stack 46 with a control damper 48 is provided to permit the escape of contaminants and combustion products from the preheat zone 2.

Preheating must be done at a high rate with very brief exposure to combustion products so that the amount of oxide formed on the strip surfaces is kept low. Small amounts of oxide can be reduced with relative ease in the reducing zone 3, but an excess of oxide is objectionable for obvious reasons. In order to complete the preheating in a short time, the preheating zone 2 must operate at a much higher temperature than is proper for galvanizing. For example, when heating the strip 1 from room temperature to 900° F., the ambient temperature of the preheating zone 2 must be around 2000° F. for a strip feeding rate of about 5000 pounds per hour per foot width over a preheating zone length of about 12 feet. In employing a temperature gradient of this order, a serious problem is encountered with unexpected strip slowdown or stoppage because the refractory lining continues to supply heat even though the burners 45 are shut off. The lining contains enough stored heat to raise the temperature of the strip in a short time to nearly the ambient temperature of the preheat zone. For the example given, in treating a strip of No. 20 U.S. standard gauge (.036 inch thick), a stoppage of 30 seconds in the preheating zone 2 will result in a strip temperature of approximately 1600° to 1800° F. In the oxidizing atmosphere of the preheating zone this will cause severe oxidation of the strip requiring a cutting and rethreading operation before treatment can be resumed.

Figure 3:
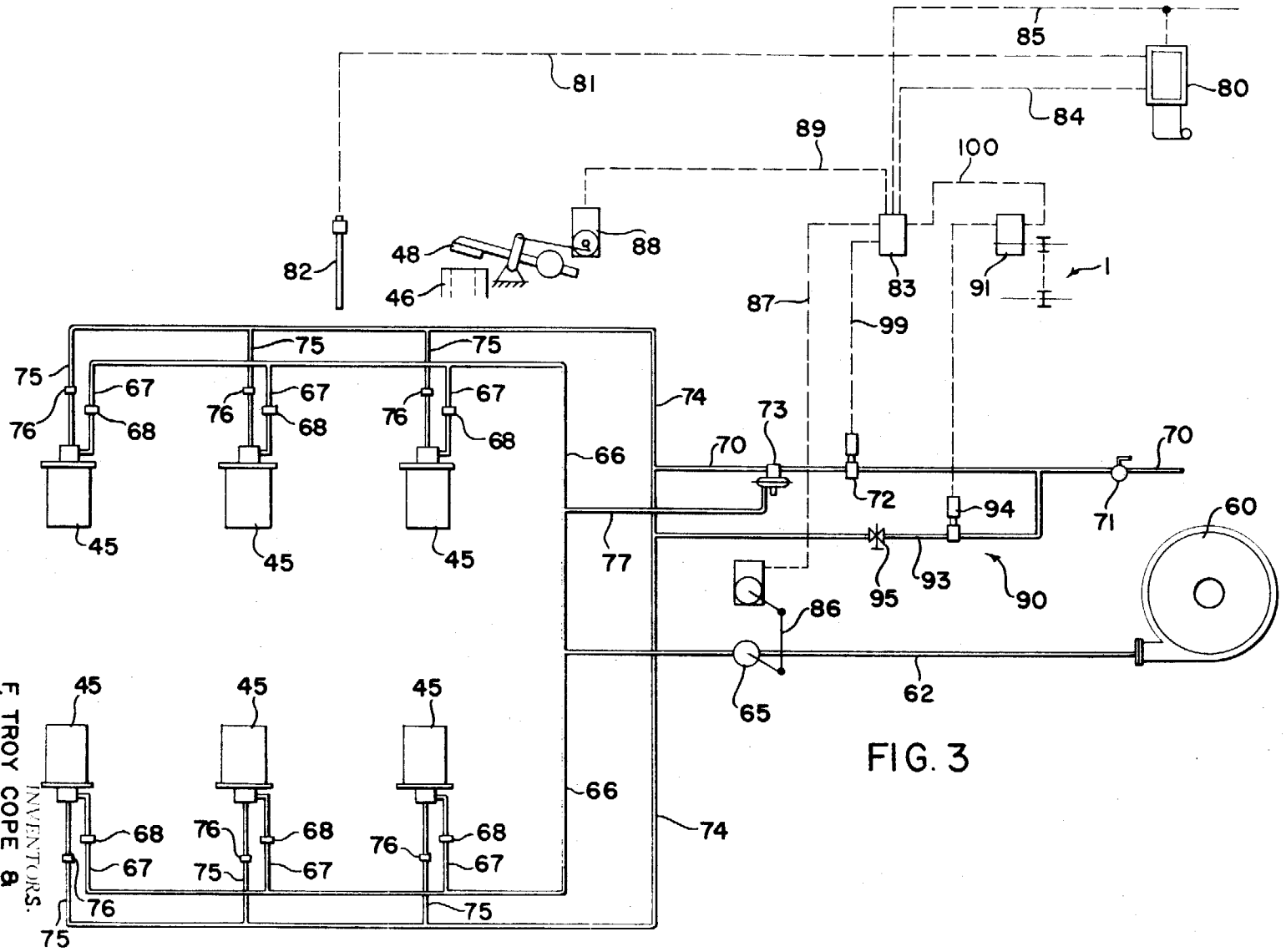

In accordance with the invention, the portion of the strip in the preheating zone is protected during slow down or stoppage by a furnace purging system. Referring to the fuel system diagram in FIGURE 3, the burners 45 of the preheat zone 2 are supplied with combustion air from a blower 60 through a primary main 62, control valve 65, headers 66 and burner connections 67. Restricted orifice fittings 68 are located in connections 67, however, if the burners provide substantially equal flow, orifice fittings 68 may be unnecessary. Similarly, fuel in the form of neutral gas flows from supply line 70 at a suitable pressure through shutoff valve 71, solenoid operated gas valve 72, pressure loaded regulating valve 73, headers 74 and connections 75 to the burners 45. Orifice fittings 76, or alternatively adjustable throttling valves at like locations, may be provided to develop suitable flow resistance for the fuel gas to maintain the correct air/fuel combustion ratio. Line 77 extends from one of the air headers 66 to pressure regulator 73 to regulate fuel in the headers 74 in accordance with line air pressure, thus maintaining a constant air/fuel ratio over a considerable range of pressure. Suitable ignition means (not shown) such as pilot burners would be installed in each burner 45. During normal operation, the air and gas valves 65, 72 are maintained open and the temperature of the preheat zone 2 is regulated by a control pyrometer 80 connected through line 81 to a thermocouple 82 extending into the interior of the preheat zone 2. A relay 83 is connected to the pyrometer 80 through lines 84, 85 and upon impulse due to a change in temperature directed by the thermocouple 82, will actuate the combustion air valve operator 86 through line 87 to open or close air valve 65 in accordance with the temperature requirements of the preheat zone 2. Pressure regulator 73 is accordingly adjusted to deliver fuel gas equal to the pressure in the air headers 66. Also during such normal operation, control damper 48 is held open by its operator 88 which is connected to relay 83 through line 89.

As provided by the invention, the existing fuel system described is associated or has superimposed thereon a purging system generally indicated at 90. The purging system 90 includes strip motion sensitive switch 91 preferably connected to one of the drive rolls for the strip. A bypass line 93 connects at one end with the gas main line 70 and at the other end with a gas header 74. A normally closed solenoid operated bypass control valve 94 is connected in the bypass line 93 for operation by the motion sensitive switch 91. Also, air valve control 86, normally open gas solenoid valve 72 and damper control 88 are actuated by the motion sensitive switch 91 through the relay 83 connected thereto by line 100.

In the event of unavoidable strip stoppage or dangerous slowdown of strip travel, the motion sensitive switch 91 will actuate control relay 83 to cause air valve 65, gas valve 72 and damper 48 to close and simultaneously to cause bypass valve 94 to open introducing raw natural gas through the gas line headers 74, burner connections 75 and into the interior of the preheat zone 2 through the existing burners 45. With the damper 48 closed, the preheat zone 2 is effectively closed to exclude air, and when a controlled flow of raw natural gas is introduced, it quickly mixes with the residual combustion products from burners 45, and combustion products from the unextinguished pilot burners associated therewith to make the preheat zone reducing preventing oxidation of the strip surfaces. In addition, the supplementary flow of the dissociated ammonia continues through opening 38 from the reducing zone 3 to further protect the strip from oxidation. Any air which might tend to leak in small openings of the furnace shell due to the shutdown of burners 45 is excluded by the overpressure caused by the rapid introduction of the raw gas and continued flow of dissociated ammonia. No spontaneous combustion or accidental explosion can take place since the percentage of free oxygen in the residual combustion products is well below that necessary to support combustion or provide an explosive mixture. Regulator valve 95 in the bypass line 93 controls the amount of gas at a rate sufficient to keep the concentration high and prevent entrance of substantial amounts of air. When pilot burners are used, they may continue to operate during periods of interrupted strip travel, so as to be ready to ignite the combustible mixture supplied to the burners upon resumption of operation. The small volume of combustion products from the pilots is diluted by the emergency atmosphere so that any oxidizing effect of such combustion products is substantially nullified.

Upon resumption of strip movement, switch 91 restores air valve 65, gas valve 72 and damper 48 to the normally open position and simultaneously closes bypass valve 94. The pilot burners which have remained ignited now initiate combustion. The resumption of operation takes place safely because air and gas are supplied to the burners in the proper mixture to support complete combustion and virtually no uncombined oxygen enters the preheat zone 2 which is momentarily rich in raw natural gas from the purging operation. Eventually the natural gas will be dissipated out the flue 46.

It will be appreciated that the invention utilizes nearly all of the piping of the existing fuel system for supplying the purging gas during shutdown and the burners themselves serve as apertures for introducing the gas. However, if desired, separate inlets may be provided independent of the burners. Bypass valve 94 would then be arranged to control suitable piping leading to a manifold for such separate inlets. Also, should a gas such as dissociated ammonia, rather than raw natural gas, be used for the protective atmosphere, then the valve 94 would be connected to the special atmosphere gas rather than to the main gas line 70, however, one of the chief advantages of the invention is that no special atmosphere supply is needed and the existing burner fuel is utilized as a purging atmosphere.

Having now described the preferred embodiment of the invention it will be clear to those skilled in the art that certain modifications may be made without deviating from the intended scope of the invention as defined in the appended claims.

We claim:

1. In combination with a gas fuel system for a continous *ferrous* strip heating chamber, *having a direct-gas-fired pre-heat zone and a reducing atmosphere maintained heating zone, pre-heat zone* purging means comprising: a control system responsive to a reduction in a predetermined rate of strip travel for shutting off the fuel mixture supply of the *pre-heat zone* fuel system, and *an external source of pre-heat chamber* protective atmosphere *and* means responsive to said control system to simultaneously *and rapidly* introduce [a gas] *said pre-heat chamber protective atmosphere* into the *pre*-heating chamber to *quickly purge the normal pre-heat chamber operating atmosphere and thereby to* prevent oxidation of the strip surfaces during said reduction in predetermined rate of travel.

2. The combination as set forth in claim 1 wherein the fuel system includes: a plurality of gas burners for heating said chambers, separate air and gas manifolds connected to each burner to supply the fuel mixture to sustain combustion during the predetermined rate of strip travel, an air valve member in the air manifold responsive to said control system to extinguish combustion in said burners, and the existing burners and gas line connections being included in said protective atmosphere means whereby the protective atmosphere is the same gas used as fuel during the predetermined rate of strip travel.

3. The combination as set forth in claim 2 wherein a gas valve member is situated in the gas manifold and is responsive to said control system to shut off gas to the burners, said protective atmosphere means comprising: a bypass line connecting each burner with a source of protective gas, and a normally closed valve member situated in the bypass line responsive to said control system to open simultaneously with the closing of said air and gas valve members whereby said burners serve as nozzles for introducing the protective atmosphere into the heating chamber.

4. The combination as set forth in claim 3 wherein the bypass line connects across the gas valve in the existing gas line whereby the protective atmosphere is the same gas used as fuel during the predetermined rate of strip travel.

5. In a strip galvanizing line having a direct-gas-fired [preheating] *pre-heating* chamber from which entry of outside air is restricted during normal operation, a purging system for preventing overoxidation of a portion of the strip due to stoppage in the [preheating] *pre-heating* chamber comprising: strip motion sensing means for detecting when normal strip movement is interrupted, normally open valve means controlled by said strip motion sensing means operatble to close upon indication of strip stoppage and disconnect the air-gas supply to the [preheating] *pre-heating* chamber and normally closed valve means controlled by the strip motion sensing means to open simultaneously upon indication of strip stoppage and connect a source of special atmosphere to said [preheating] *pre-heating* chamber, the atmosphere being supplied at a rate sufficient to exclude the entry of outside air and prevent reaction of free oxygen with the strip surfaces whereby the portion of the strip which remains motionless in the [preheating] *pre-heating* chamber is protected until normal operation can resume.

6. In a strip galvanizing line as set forth in claim 5 wherein a plurality of burners open into the [preheating] *pre-heating* chamber, separate air and gas manifolds deliver a fuel mixture to each burner to sustain combustion during normal operation, and a bypass line connectable between the gas manifold and main supply is controlled by said normally closed valve means whereby the existing gas delivery lines serve alternatively to supply a protective atmosphere during strip stoppage.

7. The method of preventing overoxidation of a continuously moving *ferrous* metal strip due to the exposure of a portion thereof for a prolonged period to the hostile *oxidizing* atmosphere in a direct-gas-fired *pre*-heating [chamber] *zone of an annealing furnace, also having a reducing atmosphere heating zone,* in the event of a stoppage comprising in the steps of *detecting the stoppage of said strip,* shutting off [the source of air to the gas heating means] *the gas-fired pre-heating means* and simultaneously rapidly introducing [a] *an external supply of* protective gas *responsive to said work stoppage detection* to [render the hostile atmosphere neutral with respect to the strip metal] *quickly purge said hostile oxidizing atmosphere from said pre-heat zone and to maintain a protective atmosphere in said pre-heating zone* until normal operation can resume.

8. In a method of continuously moving a *ferrous* metal strip through [a treating] *an annealing furnace having a pre-heating chamber wherein said pre-heating* chamber *is* supplied with a hostile atmosphere containing ingredients degradative to said strip; the movement[,] characterized in a procedure for preventing excessive degradation of said strip in said *pre-heating* [treating] chamber due to a longer than normal exposure to said hostile atmosphere, comprising the steps of *sensing longer than normal exposure to said hostile atmosphere,* discontinuing the supply to said *pre-heat* chamber of at least the degradative ingredients of said hostile atmosphere, and simultaneously *rapidly* supplying to said *pre-heating* chamber [a] *an external supply of* protective gas to dilute, [and] render neutral *and quickly purge* residual degradative ingredients *and to maintain a protective atmosphere in said pre-heating chamber until normal movement of the strip resumes.*

*9. In a method of treating continuously moving ferrous metal strip in a heat treating furnace including a direct-fired pre-heating chamber connected with a protective atmosphere heating chamber into which the strip moves from the direct-fired pre-heating chamber, said protective amosphere heating chamber being pressurized by a protective atmosphere gas to a pressure greater than the pressure in the direct-fired pre-heating chamber so that protective atmosphere gas gradually flows from the protective atmosphere heating chamber into the direct-fired pre-heating chamber, said direct-fired pre-heating chamber being heated to a substantially higher temperature*

*than that to which said strip is normally raised during treatment in said heating chamber by fuel discharging flue gases directly into said pre-heating chamber and providing at least a portion of a normal operating atmosphere for said pre-heating chamber, said normal operating atmosphere including ingredients which are oxidizing with respect to said strip at extremely high temperatures but said atmosphere as a whole being not at all or not particularly oxidizing to said strip at temperatures and time periods to which said strip is heated and exposed during normal treatment operations, continuously moving said strip through said pre-heating chamber at a rate to raise its temperature to a point substantially less than the temperature of said pre-heating chamber, characterized in that, in the event of stoppage of said strip in said pre-heating chamber, excessive oxidation due to over exposure in the normal operating atmosphere, which becomes extremely oxidizing to said strip at higher strip temperatures and longer time periods of exposure than those to which the strip is normally heated and exposed, comprising the steps of shutting down said fuel burners to eliminate heat input to the pre-heating chamber and production of oxidizing ingredients in the normal operating atmosphere, and simultaneously rapidly introducing a special atmosphere gas from an external source into said pre-heating chamber to replace said normal operating atmosphere and to prevent entrance of outside air into said pre-heating chamber, said special atmosphere gas being different from said normal operating atmosphere and not oxidizing to said strip even at strip temperatures and time periods of strip exposure greater than those to which said strip is heated and exposed during normal operation, said special atmosphere gas being in addition to, and greatly in excess of, said protective gas atmosphere which normally gradually flows into said heating chamber from said protective atmosphere chamber.*

*10. Apparatus for treating continuously moving ferrous metal strip, comprising: a direct-fired pre-heating chamber connected with a protective atmosphere heating chamber, protective atmosphere gas means for pressurizing said protective atmosphere heating chamber to a greater pressure than the pressure in said pre-heating chamber so that protective atmosphere gas gradually flows from said protective atmosphere heating chamber into said preheating chamber during normal operation of said apparatus, gas fuel burners for heating said preheating chamber to a temperature substantially higher than that to which said strip is normally raised during treatment in said heating chamber, said fuel burners being*

*positioned for discharging flue gases directly into said pre-heating chamber to provide at least a portion of a normal operating atmosphere for said pre-heating chamber, said normal operating atmosphere including ingredients which are oxidizing with respect to said strip at extremely high temperatures and after long time periods of exposure, but said normal operating atmosphere as a whole being not at all or not particularly oxidizing to said strip at temperatures and time periods to which said strip is heated and exposed during normal pre-heat treatment operations, feed means for continuously moving said strip through said pre-heating chamber and into said protective atmosphere heating chamber at a rate to raise its temperature to a point substantially less than the temperature of said pre-heating chamber, characterized in that protective means is provided for preventing excessive oxidation of said strip due to stoppage of said strip in said pre-heating chamber, said protection means comprising: strip speed sensing control means for shutting down said fuel burners to eliminate heat input to said pre-heating chamber and production of oxidizing ingredients in the normal operating atmosphere when the speed of said strip falls to a predetermined rate, and means for simultaneously rapidly introducing from an external source a protective atmosphere gas into said pre-heating chamber to purge said oxidizing ingredients and to prevent entrance of outside air into said pre-heating chamber, said protective gas atmosphere being in addition to said protective gas atmosphere which normally gradually flows into said pre-heating chamber from said protective atmosphere heating chamber, whereby said strip is protected from oxidation until normal movement of the strip resumes.*

References Cited

The following references, cited by the Examiner, are of record in the patented file of this patent or the original patent.

UNITED STATES PATENTS

| | | | |
|---|---|---|---|
| 2,648,531 | 8/1953 | Shorek et al. | 432—55 |
| 2,991,989 | 7/1961 | Martin | 432—45 |
| 3,269,714 | 8/1966 | McKie | 266—3 |
| 2,628,830 | 2/1953 | Kerr | 266—5 R |
| 2,845,260 | 7/1958 | Rusciano | 432—47 |
| 2,035,312 | 3/1936 | Greer et al. | 432—59 |
| 2,060,634 | 11/1936 | Otis | 432—59 |

JOHN J. CAMBY, Primary Examiner

U.S. Cl. X.R.

148—20.3; 266—3; 432—47, 59